United States Patent
Koszewnik (10) Patent No.: US 11,747,983 B2
(45) Date of Patent: Sep. 5, 2023

(54) TECHNIQUES FOR GENERATING SNAPSHOTS OF DATASETS

(71) Applicant: NETFLIX, INC., Los Gatos, CA (US)

(72) Inventor: John Andrew Koszewnik, Morgan Hill, CA (US)

(73) Assignee: NETFLIX, INC., Los Gatos, CA (US)

(*) Notice: Subject to any disclaimer, the term of this patent is extended or adjusted under 35 U.S.C. 154(b) by 0 days.

(21) Appl. No.: 15/725,259

(22) Filed: Oct. 4, 2017

(65) Prior Publication Data
US 2018/0101311 A1 Apr. 12, 2018

Related U.S. Application Data

(60) Provisional application No. 62/432,048, filed on Dec. 9, 2016, provisional application No. 62/428,640, filed
(Continued)

(51) Int. Cl.
- G06F 3/06 (2006.01)
- G06F 16/738 (2019.01)
- G06F 11/14 (2006.01)

(52) U.S. Cl.
CPC ............ G06F 3/0611 (2013.01); G06F 3/065 (2013.01); G06F 3/068 (2013.01); G06F 3/0619 (2013.01);
(Continued)

(58) Field of Classification Search
CPC .................. G06F 17/30843; G06F 2201/84
See application file for complete search history.

(56) References Cited

U.S. PATENT DOCUMENTS

| | | | | |
|---|---|---|---|---|
| 5,663,721 A | * | 9/1997 | Rossi | H03M 7/3084 341/95 |
| 7,941,619 B1 | * | 5/2011 | Rossi | G06F 11/1458 707/625 |

(Continued)

FOREIGN PATENT DOCUMENTS

EP 1 056 273 A2 11/2000

OTHER PUBLICATIONS

International Search Report for application No. PCT/US2017/055399 dated Jan. 25, 2018.
(Continued)

*Primary Examiner* — David Yi
*Assistant Examiner* — Nicholas A. Paperno
(74) *Attorney, Agent, or Firm* — Artegis Law Group, LLP (57) ABSTRACT

In various embodiments, a write state application generates a snapshot that includes one or more data values associated with a source dataset. In operation, the write state application performs one or more compression operations on the source dataset to generate a first compressed record. The write state application then serializes the first compressed record and a second compressed record to generate a first compressed record list. Finally, the write state application generates the snapshot based on the first compressed record list. When the data values are accessed from the first snapshot, the size of the snapshot is maintained. Advantageously, because the size of the snapshot is smaller than the size of the source dataset, some consumers that are unable to store the entire source dataset in random access memory (RAM) are able to store the entire snapshot in RAM.

17 Claims, 5 Drawing Sheets

Related U.S. Application Data on Dec. 1, 2016, provisional application No. 62/425,767, filed on Nov. 23, 2016, provisional application No. 62/405,157, filed on Oct. 6, 2016.

(52) U.S. Cl.
CPC .......... *G06F 3/0641* (2013.01); *G06F 3/0685* (2013.01); *G06F 11/1451* (2013.01); *G06F 16/739* (2019.01); *G06F 2201/84* (2013.01)

(56) References Cited

U.S. PATENT DOCUMENTS

| | | | |
|---|---|---|---|
| 2001/0034737 A1* | 10/2001 | Cane | G06F 11/1451 |
| 2004/0030951 A1 | 2/2004 | Armangau | |
| 2006/0064444 A1* | 3/2006 | van Ingen | G06F 11/1451 |
| 2007/0198659 A1* | 8/2007 | Lam | G06F 11/1451 |
| | | | 709/219 |
| 2011/0161297 A1* | 6/2011 | Parab | G06F 17/30156 |
| | | | 707/646 |
| 2012/0221540 A1 | 8/2012 | Rose et al. | |
| 2013/0151567 A1 | 6/2013 | Ellison et al. | |
| 2013/0204450 A1 | 8/2013 | Kagan et al. | |
| 2014/0082261 A1 | 3/2014 | Cohen et al. | |
| 2016/0020917 A1 | 1/2016 | Tuatini et al. | |
| 2017/0039372 A1* | 2/2017 | Koval | G01D 4/004 |

OTHER PUBLICATIONS

International Search Report for application No. PCT/US2017/055401 dated Jan. 24, 2018.
Non-Final Office Action for U.S. Appl. No. 15/725,261, dated Jan. 18, 2019, 15 pages.
Final Office Action for U.S. Appl. No. 15/725,261, dated May 14, 2019, 15 pages.

\* cited by examiner

TECHNIQUES FOR GENERATING SNAPSHOTS OF DATASETS

CROSS-REFERENCE TO RELATED APPLICATIONS

This application claims the priority benefit of the U.S. Provisional Patent Application having Ser. No. 62/405,157 and filed on Oct. 6, 2016. This application also claims priority benefit to U.S. Provisional Patent Application having Ser. No. 62/425,767 and filed on Nov. 23, 2016. This application also claims priority benefit to U.S. Provisional Patent Application having Ser. No. 62/428,640 and filed on Dec. 1, 2016. This application also claims priority benefit to U.S. Provisional Patent Application having Ser. No. 62/432,048 and filed on Dec. 9, 2016. The subject matter of these related applications is hereby incorporated herein by reference.

BACKGROUND OF THE INVENTION

Field of the Invention

Embodiments of the present invention relate generally to data processing and, more specifically, to techniques for generating snapshots of datasets.

Description of the Related Art

In a typical video distribution system, there is a stored dataset that includes metadata describing various characteristics of the videos. Example characteristics include title, genre, synopsis, cast, maturity rating, release date, and the like. In operation, various applications executing on servers included in the system perform certain read-only memory operations on the dataset when providing services to end-users. For example, an application could perform correlation operations on the dataset to recommend videos to end-users. The same or another application could perform various access operations on the dataset in order to display information associated with a selected video to end-users.

To reduce the time required for applications to respond to requests from end-users, a server oftentimes stores a read-only copy of the dataset in local random access memory (RAM). One limitation of storing a dataset in RAM is that, over time, the size of the dataset typically increases. For example, if the video distributor begins to provide services in a new country, then the video distributor could add subtitles and country-specific trailer data to the dataset. As the size of the dataset increases, the amount of RAM required to store the dataset increases and may even exceed the storage capacity of the RAM included in a given server. Further, because of bandwidth limitations, both the time required to initially copy the dataset to the RAM and the time required to subsequently update the copy of the dataset increase.

To enable the size of a dataset to grow beyond the storage capacity of the RAM included in a given server, the dataset can be stored in a central location having higher capacity memory, and then the server can remotely access the dataset. One drawback of this approach, however, is that the latencies associated with accessing the dataset from the remote location may increase the time required for one or more applications to respond to end-user requests to unacceptable levels. To reduce the latencies associated with accessing the dataset from a remote location, developers could attempt to redesign the access patterns of the applications. However, oftentimes the time and effort required to redesign the access patterns of the applications is prohibitive.

As the foregoing illustrates, what is needed in the art are more effective techniques for implementing datasets in computing environments.

SUMMARY OF THE INVENTION

One embodiment of the present invention sets forth a method for generating a snapshot of a source dataset. The method comprises performing one or more compression operations on a first source dataset having a first size to generate a first compressed record; serializing the first compressed record and a second compressed record to generate a first compressed record list; and generating a first snapshot having a second size based on the first compressed record list, wherein the second size is less than the first size, where, when one or more data values included in the first snapshot and associated with the first source dataset are accessed from the first snapshot, the first size of the first snapshot is maintained.

One advantage of the disclosed techniques is that because the size of the snapshot is smaller than the size of the source dataset, some consumers that are unable to store the entire source dataset in random access memory (RAM) are able to store the entire snapshot in RAM. Further, if the snapshot is stored in RAM, latencies experienced while performing read-only operations on the snapshot are decreased relative to the latencies typically experienced while performing read-only operations on a dataset that is stored in a remote location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

In sum, the disclosed techniques may be used to efficiently implement datasets in computing environments. A dataset dissemination system includes, without limitation, a source dataset, a data model, a producer, a central file store, an announcement subsystem, and any number of consumers. During an initial cycle, a write state engine included in the producer gathers source data values included in a source dataset. The write state engine translates the source data values into compressed data based the data model. Subsequently, the write state engine generates a snapshot that includes the compressed records and copies the snapshot to the central file store. The snapshot represents the source data values at an initial state 0. The write state engine then announces that state 0 is the latest state via the announcement subsystem.

During each subsequent cycle N, the write state engine gathers source data values from the data source and generates state files. The state files includes, without limitation, a snapshot corresponding to the state N, a delta file, and a reverse delta file. The delta file includes a set of encoded instructions to transition from the state (N−1) to the state N. By contrast, the reverse delta file includes a set of encoded instructions to transition form the state N to the state (N−1). Subsequently, the producer copies the state files to the central file store and announces the availability of state N via the announcement system.

Periodically, for each consumer, a read state engine included in the consumer determines the optimal state based on the announcement system. In general, the optimal state is the latest reliable and available state. If the consumer is starting-up or an in-memory dataset stored in RAM does not correspond to the optimal state, then the read state engine generates and executes a plan to modify the in-memory dataset to correspond to the optimal state. For example, if the consumer is starting-up and the optimal state is "N," then the read state engine could copy the snapshot associated with the state N from the central file store to the RAM to generate an in-memory dataset. By contrast, if the RAM already stores an in-memory dataset corresponds to the state M, then the read state engine could sequentially apply a series of delta files or reverse delta files to the in-memory dataset. Applying the series of files to the in-memory dataset modifies the in-memory dataset to represent the state N.

Dataset Dissemination System Overview

Figure 1:
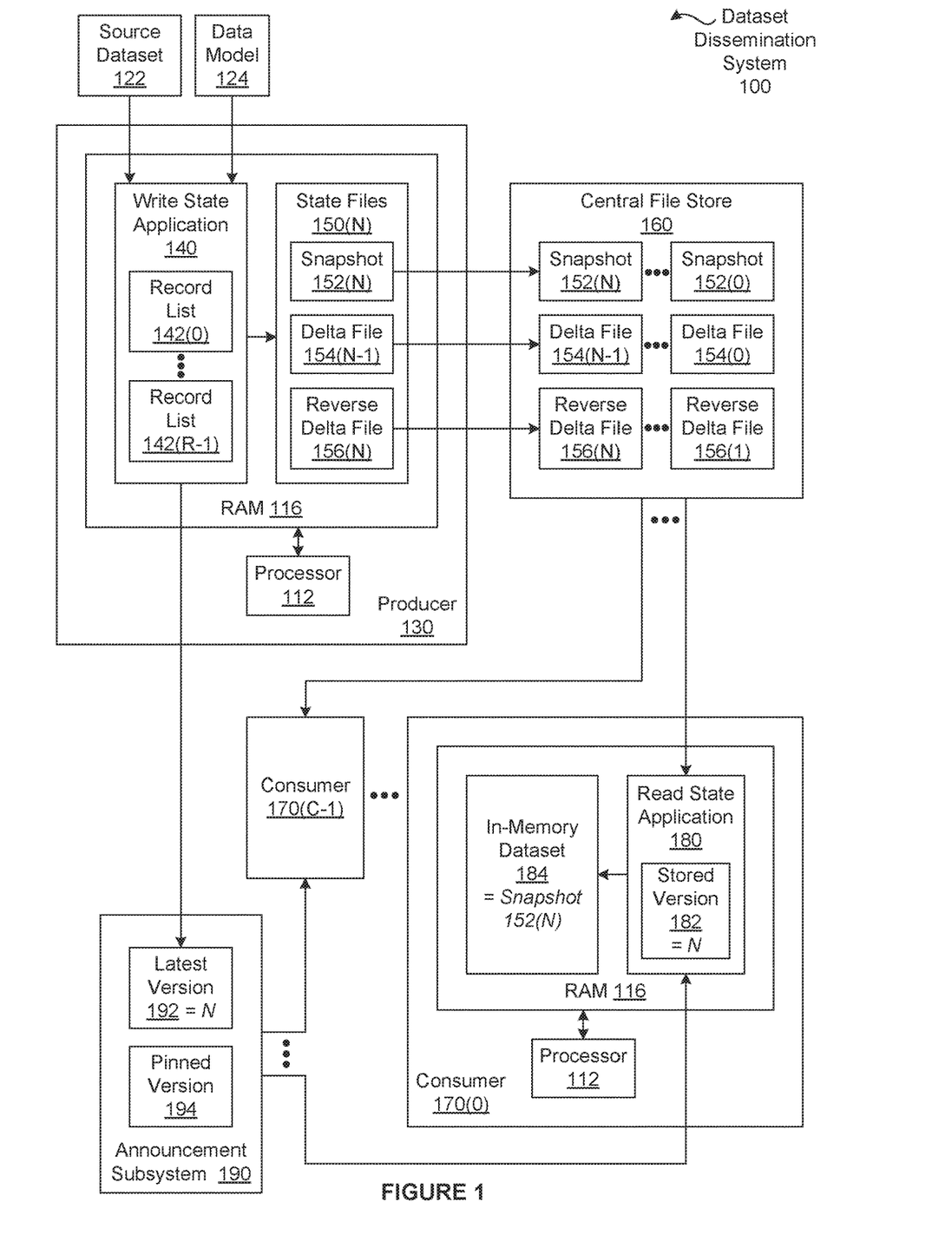
FIG. 1 is a conceptual illustration of a dataset dissemination system configured to implement one or more aspects of the present invention.

FIG. 1 is a conceptual illustration of a dataset dissemination system 100 configured to implement one or more aspects of the present invention. As shown, the dataset dissemination system 100 includes, without limitation, a source dataset 122, a data model 124, a producer 130, a central file store 160, an announcement subsystem 190, and any number of consumers 170. For explanatory purposes, multiple instances of like objects are denoted with reference numbers identifying the object and parenthetical numbers identifying the instance where needed.

The producer 130 and each of the consumers 170 include, without limitation, a processor 112 and a random access memory (RAM) 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The RAM 116 stores content, such as software applications and data, for use by the processor 112 of the compute instance 110. Each of the RAMs 116 may be implemented in any technically feasible fashion and may differ from the other RAMs 116. For example, a capacity of the RAM 116 included in the producer 130 could be larger than a capacity of the RAM 116 included in the consumer 170(1).

In some embodiments, additional types of memory (not shown) may supplement the RAM 116. The additional types of memory may include additional RAMs, read only memory (ROM), floppy disk, hard disk, or any other form of digital storage, local or remote. In the same or other embodiments, a storage (not shown) may supplement the RAM 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the producer 130 and each of the consumers 170 are configured to implement one or more applications and/or one or more subsystems of applications. For explanatory purposes only, each application and each subsystem is depicted as residing in the RAM 116 of a single compute instance and executing on a processor 112 of the single compute instance. However, as persons skilled in the art will recognize, the functionality of each application and subsystem may be distributed across any number of other applications and/or subsystems that reside in the memories of any number of compute instances and execute on the processors 112 of any number of compute instances in any combination. Further, the functionality of any number of applications and/or subsystems may be consolidated into a single application or subsystem.

In general, for each of the producers 170, the dataset dissemination system 100 enables one or more applications executing on the processor 112 to perform read-only operations on a copy of a dataset that is stored in the RAM to provide services to end-users. For example, in some embodiments, each of the producers 170 could correspond to a server executing in a video distribution system.

In a conventional video distribution system, there is a conventional dataset that includes metadata describing various characteristics of the videos. Example characteristics include title, genre, synopsis, cast, maturity rating, release date, and the like. In operation, various applications executing on servers included in the system perform certain read-only memory operations on the conventional dataset when providing services to end-users. For example, an application could perform correlation operations on the conventional dataset to recommend videos to end-users. The same or another application could perform various access operations on the conventional dataset in order to display information associated with a selected video to end-users.

To reduce the time required for applications to respond to requests from end-users, a server oftentimes stores a read-only copy of the conventional dataset in local RAM. One limitation of storing a conventional dataset in RAM is that, over time, the size of the conventional dataset typically increases. For example, if the video distributor begins to provide services in a new country, then the video distributor could add subtitles and country-specific trailer data to the conventional dataset. As the size of the conventional dataset increases, the amount of RAM required to store the conventional dataset increases and may even exceed the storage capacity of the RAM included in a given server. Further, because of bandwidth limitations, both the time required to initially copy the conventional dataset to the RAM and the time required to subsequently update the copy of the conventional dataset increase.

To enable the size of a conventional dataset to grow beyond the storage capacity of the RAM included in a given server, the conventional dataset can be stored in a central location having higher capacity memory, and then the server can remotely access the conventional dataset. One drawback of this approach, however, is that the latencies associated with accessing the conventional dataset from the remote location may increase the time required for one or more applications to respond to end-user requests to unacceptable levels.

While the limitations above are described in conjunction with a video distribution system, similar limitations exist in many types of systems that implement conventional techniques to operate on read-only datasets. Together, a write state application 140 and a read state application 180 mitigate the limitations associated with conventional techniques for these types of system.

As shown, the write state application 140 resides in the RAM 116 and executes on the processor 112 of the producer 130. In general, the write state application 140 sequentially executes any number of write cycles in response to any type of write cycle criterion. For example, the write cycle criterion could be an interval of time between write cycles. Prior to executing an initial write cycle, the write state application reads a data model 124.

The data model 124 defines a structure for the source data values included in a source dataset 122. In particular, the data model 124 includes, without limitation, any number of schemas (not shown in FIG. 1). As described in greater detail in conjunction with FIGS. 3A-3C, a schema defines a structure for a strongly typed collection of fields and/or references that is referred to herein as a "record." Each schema defines the structure for a record of a different type.

The source dataset 122 represents any amount and type of source data values in any technically feasible fashion. Over time, the source data values represented by the source dataset 122 may change. As referred to herein, a "state" corresponds to the source data values included in the source dataset 122 at a particular point in time. Each state is associate with a version. For instance, an initial state is associated with a version of 0.

To initiate a write cycle associated with a current state N, the write state application 140 reads the source data values represented in the source dataset 122. The write state application 140 generates and/or updates one or more record lists 142 based on the schemas and the source data values. Each of the record lists 142 includes a type and one or more records. For example, in some embodiments, the source dataset 122 includes metadata associated with movies, and the data model 124 includes a schema that defines a structure for a record of a type "movie object." Based on the source dataset 122 and the data model 124, the write state application 140 generates the record list 142 that includes records representing movies.

Notably, as part of initially generating a particular record, the write state application 140 executes any number of compression operations on the corresponding source data values to generate compressed data (not shown in FIG. 1). Some examples of compression operations include, without limitation, deduplication operations, encoding operations, packing operations, and overhead elimination operations. The compressed data for a particular record represents the source data values associated with the record in a fixed-length bit-aligned format that is amenable to individual access of the different source data values.

Figure 2A:
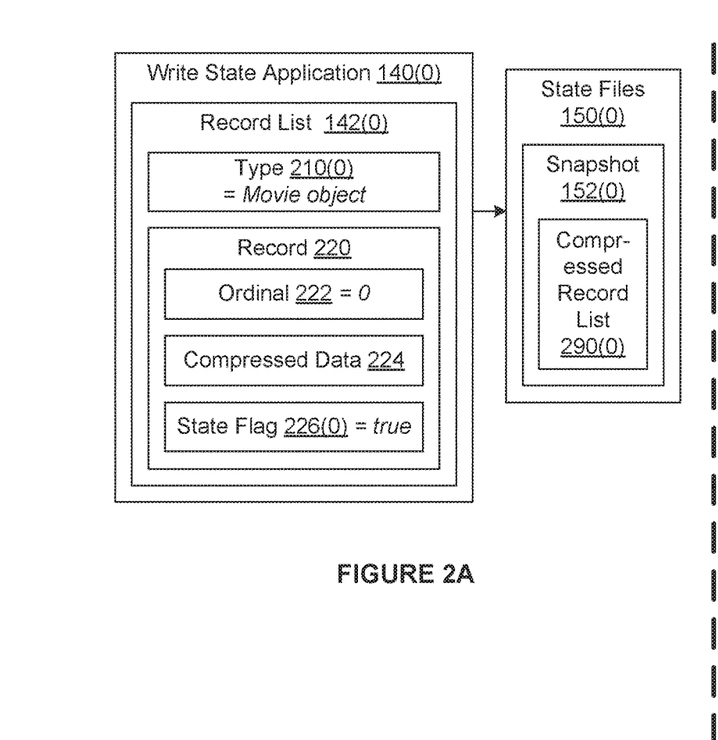
FIGS. 2A and 2B illustrate state files that are generated by the write state application of FIG. 1 and correspond to two different states of a source dataset, according to various embodiments of the present invention.
Figure 2B:
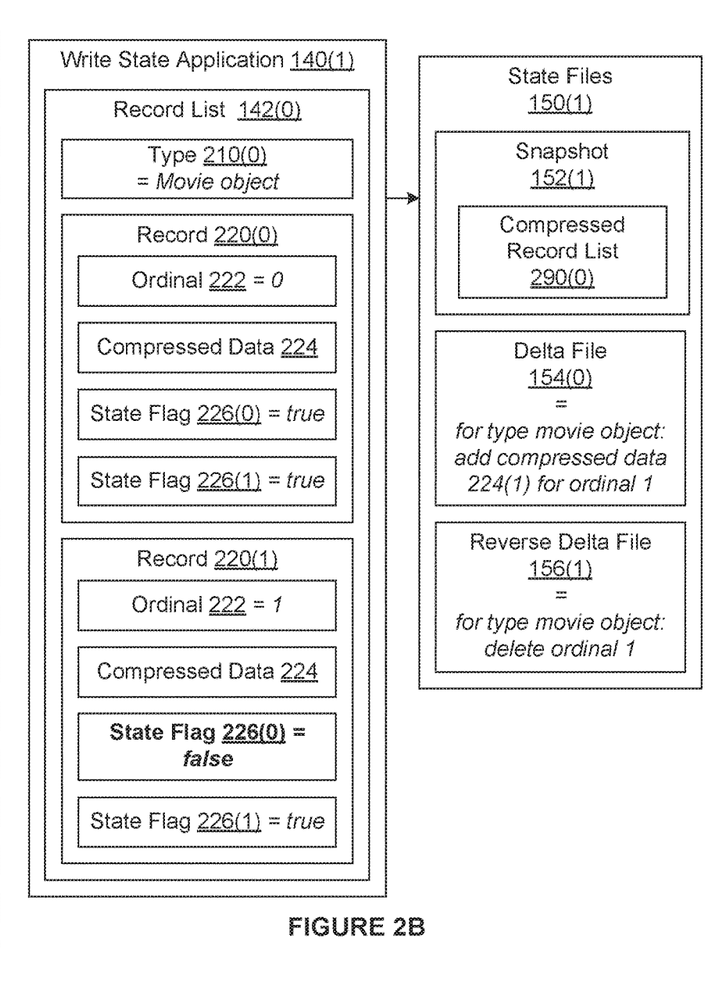

As described in greater detail in conjunction with FIGS. 2A and 2B, each record includes one or more state flags (not shown in FIG. 1) that indicate whether the record represents a previous state (N−1), the current state N, or both the previous state (N−1) and the current state N. In this fashion, each record enables the write state application 140 to tracks the differences between the previous state (N−1) and the current state N.

After generating the record lists 142, the write state application 140 generates state files 150(N) associated with the current state N. As shown, the state files 150(N) include, without limitation, a snapshot 152(N), a delta file 154(N−1), and a reverse delta file 156(N). The snapshot 152(N) represents the state associated with the current version N. The write state application 140 generates the snapshot 152(N) based on the compressed data included in the records that represent the current state N as indicated via the state flags.

The delta file 154(N−1) specifies a set of instructions to transition from an immediately preceding snapshot 152(N−1) to the snapshot 152(N). The write state application 140 generates the delta file 154(N−1) based on the the records that are included in exactly one of the current snapshot 152(N) and the preceding snapshot 152(N−1) as indicated via the state flags. The reverse delta file 156(N) specifies a set of instructions to transition from the current snapshot 152(N) to the immediately preceding snapshot 152(N−1). The write state application 140 generates the reverse delta file 156(N) based on the the records that are included in exactly one of the current snapshot 152(N) and the preceding snapshot 152(N−1) as indicated via the state flags.

Notably, because there is no preceding state associated with the initial state, the state files 150(0) associated with the initial state include empty placeholders for the delta file 154 and the reverse delta file 156. In alternate embodiments, the state files(s) 150(0) may be associated with the single snapshot 152(0) in any technically feasible fashion.

Subsequently, for all but the write cycle associated with initial state, the write state application 140 performs validation operations on the state files 150(N). First, the write state application 140 applies the delta file 152(N−1) to the snapshot 152(N−1) to generate a forward snapshot. The write state application 140 then applies the reverse delta file 154(N) to the snapshot 152(N) to generate a reverse snapshot. If the forward snapshot matches the snapshot 152(N) and the reverse snapshot matches the snapshot 152(N−1), then the write state application 140 determines that the state files 150(N) are valid. By contrast, if the forward snapshot differs from the snapshot 152(N) or the reverse snapshot differs from the snapshot 152(N−1), then the write state application 140 determines that the state files 150(N) are invalid.

If the state files 150(N) are invalid, then the write state application 140 issues an error message and terminates the current write cycle. The next write cycle is associated with the version N. If, however, the state files 150(N) are valid, then the write state application 150 copies the state files 150(N) to the central file store 160. The central file store 160 may be implemented in any technically feasible fashion. Further, the central file store 160 may be configured to include any number of the snapshots 152, the delta files 154, and the reverse delta files 156 in any combination.

The write state application 140 then announces that the state files 150(N) are available via the announcement subsystem 190. More specifically, the write state application 140 sets a memory location included in the announcement subsystem 190 that stores a latest version 192 equal to the current version N. In alternate embodiments, the write state application 140 may announce that the state files 150(N) are available in any technically feasible fashion. Subsequently, the write state application 140 increments the current state and executes a new write cycle.

As shown, a different copy of the read state application 180 resides in the RAM 116 and executes on the processor 112 of each of the consumers 170. In general, the read state application 180 sequentially executes any number of read cycles in response to any type of read cycle criterion. Examples of read cycle criterion include detecting a change to the latest version 192, detecting a change to a pinned version 194, and a time interval between read cycles, to name a few.

The read state application 180 includes, without limitation, a stored version 182. The stored version 182 specifies the version of a snapshot 1552 stored in the RAM 116 as an in-memory dataset 184. Prior to an initial cycle, the read state application 180 sets the stored version 182 to a value indicating that the read state application 180 has not yet stored any of the snapshots 152 in the RAM 116.

To initiate a read cycle, the read state application 180 determines an optimal version based on the announcement subsystem 190. First, the read state application 180 determines whether the announcement subsystem 190 specifies a pinned version 194. The pinned version 194 may be specified in any technically feasible fashion by any entity to indicate that consumers 170 should transition to a snapshot 152(M), where M is less than or equal to the pinned version 194. The pinned version 194 may reflect an error that is associated with the snapshots 150 corresponding to versions following the pinned version 194.

If the announcement subsystem 190 specifies the pinned version 194, then the read state application 180 sets the optimal version equal to the pinned version 194. If, however, the announcement subsystem 190 does not specify the pinned version 194, then the read state application 180 sets the optimal version equal to the latest version 192.

The read state application 180 may interact with the announcement subsystem 190 in any technically feasible fashion. For example, the read state application 180 could perform a read operation on two different memory locations included in the announcement subsystem 190 that store, respectively, the pinned version 194 and the latest version 192. In another example, the read state application 180 could subscribe to a notification service provided by the announcement subsystem 190. The announcement subsystem 190 would then notify the read state application 180 whenever the pinned version 194 or the latest version 192 changes.

The read state application 180 determines a next version based on the optimal version and the state files 150 stored in the central file store 160. More precisely, the read state application 180 determines one or more "available" versions for which the required state files 150 are stored in the central file store 160. Subsequently, the read state application 180 selects the available versions that do not exceed the optimal version. Then, the read state application 180 sets the next version equal to the highest selected version.

If the stored version 182 is equal to the next version, then the read state application 180 terminates the read cycle. If, however, the stored version 182 is not equal to the next version, then the read state application 180 generates a plan to transition the in-memory dataset 184 from the stored version 182 to the next version. If the stored version 182 is less than the next version, then the plan includes one of the snapshots 152 and/or one or more delta files 154. If the stored version 182 is greater than the next version, then the plan includes one of the snapshots 152 and/or one or more of the reverse delta files 156

If one of the snapshots 152 is included in the plan, then the read state application 180 selects the snapshot 152 specified in the plan. The read state application 180 then copies the selected snapshot 152 from the central file store 160 to the random access memory (RAM) 116 to generate the in-memory dataset 184. The read state application 180 then sets the stored version 182 equal to the version associated with the selected snapshot 152.

Subsequently, the read state application 180 determines whether the stored version 182 is less than the next version. If the stored version 182 is less than the next version, then for each of the delta files 152 included in the plan, the read state application 180 sequentially applies the delta file 152 to the in-memory dataset 184. If the stored version 182 is not less than or equal to the next version, then for each of the reverse delta files 154 included in the plan, the read state application 180 sequentially applies the reverse delta file 154 to the in-memory dataset 184.

Finally, the read state application 180 sets the stored version 182 equal to the next version. Advantageous, the read state application 180 may perform any number of operations with the in-memory dataset 184 while retaining a size of the in-memory dataset 184. For example, the read state application 180 could perform an unaligned read operation on the in-memory dataset 184. Further, the amounts of bandwidth consumed to initialize and update the in-memory dataset 184 are decreased relative to the amounts of bandwidth typically experienced with prior art solutions to storing local copies of datastores in the RAM 118.

Note that the techniques described herein are illustrative rather than restrictive, and may be altered without departing from the broader spirit and scope of the invention. Many modifications and variations on the functionality provided by the dataset dissemination system 100, the write state application 140, the read state application 180, the announcement subsystem 190, and the central file store 160 will be apparent to those of ordinary skill in the art without departing from the scope and spirit of the described embodiments. For instance, in various embodiments, any number of the techniques or devices may be implemented while other techniques may be omitted or replaced in any technically feasible fashion.

In various embodiments, the dataset dissemination system 100 may provide additional functionality to perform a variety of tasks related to managing the in-memory datasets 184. In some embodiments, the write state application 140 may generate an application specific interface (API) based on the data model 140 to facilitate performing read-only operations on source data values represented in the in-memory dataset 184. Methods included in the API may or may not be agnostic with respect to the semantics of the data model 140. Methods that are agnostic with respect to the semantics of the data model 140 enable applications to apply generic operations across the in-memory dataset 184. Examples of generic methods include methods that perform scan operations, query operations, indexing operations, and grouping operations, to name a few.

In the same or other embodiments, a toolset application may include functionality to performing filtering, splitting, and/or patching. Filtering refers to omitting certain data source values from the in-memory dataset 184 when storing the in-memory dataset 184 in the RAM 116. Splitting refers to sharding a dataset into multiple datasets. Patching refers to manufacturing one or more additional delta files 154 between two adjacent snapshots 150.

In some embodiments, a metrics optimization application may optimize for performance metrics, such as metrics that measure garbage collection activities. For example, the metrics optimization application could pool and reuse memory in the heap to avoid allocation for the objects/arrays responsible for holding the actual data. Since these particular objects will be retained for a relatively long period of time (the duration of a cycle) they may live long enough to get promoted to tenured space in a generational garbage collector. Promoting non-permanent objects to tenured space will result in many more major and/or full garbage collections which will adversely affect the performance of the processors 112.

Generating In-Memory Datasets Based on a Data Model

FIGS. 2A and 2B illustrate the state files 150 that are generated by the write state application 140 of FIG. 1 and correspond to two different states of the source dataset 122, according to various embodiments of the present invention. For explanatory purposes only, the source dataset 122 includes source data values corresponding to instances of a single type 210(0) of movie object. In alternate embodiments, the source dataset 122 may include source data values corresponding to any number of instances of any number of types 210, in any combination.

FIG. 2A depicts how the write state application 140(0) generates the state file 150 when the source dataset 122 is in an initial state corresponding to a version of 0. In the initial state, the source dataset 122 includes source data values corresponding to a single instance of the data type 210(0). Accordingly, as shown, the write state application 140(0) generates the record list 142(0) that includes, without limitation, the type 210(0) of "movie object" and the record 220(0) representing the single instance. In general, the write state application 140(0) generates each of the records 220 included in a particular record list 142(i) to represent source data values corresponding to a different instance of the type 210 associated with the record list 142(i).

The record 220(0) initially includes, without limitation, an ordinal 222, compressed data 224, and a state flag 226(0). The ordinal 222 is a number that uniquely identifies a particular record 220 with respect to the other records 220 included in the record list 142. As shown, the ordinal 222 is equal to 0. As described in detail in conjunction with FIGS. 3A-3C, the compressed data 224 includes, without limitation, a compressed, fixed-length, bit-aligned representation of the source data values corresponding to the instance represented by the record 220(0).

The state flag 226(0) specifies whether the record 220(0) represents source data values that are included in the source dataset 122 associated with the initial state. As a general matter, for a particular record 220, the state flag 226(x) specifies whether the record 220 represents source data values that are included in the source dataset 122 associated with the state x. In this fashion, the source flags 226(x) facilitate the identification and tracking of differences between various states.

As shown, because FIG. 2A depicts the write state application 140(0) when the source dataset 122 is in an initial state of 0, the write state application 140(0) includes a single source flag 226(0) in the record 220. Further, because the record 220(0) represents source data values that are included in the initial source dataset 122, the write state application 140(0) sets the source flag 226(0) equal to true.

After generating the record lists 142 that represent the source dataset 122 when the source dataset 122 is in the initial state of 0, the write state application 140(0) generates the snapshot 152(0) that represents the initial state of the source dataset 122. For the initial state, the snapshot 152 comprises the snapshot 152(0) corresponding to the initial state of the source dataset 122. As shown, the snapshot 152(0) includes, without limitation, a compressed record list 290(0). The write state application 140 generates the compressed record list 290(0) based on the record list 142(0).

In general, to generate the snapshot 152(i), for each of the record lists 142, the write state application 140 selects the records 122 for which the state flag 226(i) is equal to true. For each of the record lists 142, the write state application 140 serializes the compressed data 122 included in the selected records 122 sequentially based on an increasing order of the ordinals 222 to generate an associated record bit array (not shown in FIG. 2). For each of the record lists 142, the write state application 140 then generates a compressed record list 290 based on the associated record bit array. The compressed record list 290 comprises a fixed-length and bit-aligned sequence of bits. Finally, the write state application 140 serializes the compressed record lists 290 to generate the snapshot 152(i).

In alternate embodiments, the snapshot 150 may include any amount and type of additional information. For instance, in some embodiments, the snapshot 150 may include a bitset that specifies the ordinals 222 included in the snapshot 150. In such embodiments, as part of generating the snapshot 152(i), the write state application 140 also generates the bitset.

FIG. 2B depicts how the write state application 140(1) generates the state files 150(1) when the source dataset 122 is in an subsequent state 1 corresponding to a version of 1. In the state 1, the source dataset 122 includes source data values corresponding to two instances of the data type 210(0). More specifically, the source dataset 122 includes source data values representing the single instance of the type 210(0) that was also included in the initial set of the source dataset 122 as well as source data values representing a new instance of the type 210(0).

First, the write state application 140(1) generates the new record 220(1) to represent the source data values corresponding to the new instance of the type 210(0). As shown, the new record 220(1) includes the ordinal 222 of 1, the compressed data 224 representing the new source values, the state flag 226(0) of false, and the state flag 226(1) of true. The state flag 226(0) specifies that the record 220(0) represents source data values that are not included in the source dataset 122 associated with the state 0. By contrast, the state flag 226(1) specifies that the record 220(1) represents source data values that are included in the source dataset 122 associated with the state 1.

Subsequently, the write state application 140(1) updates each of the the previously existing records 220 to include a state flag 226(1) that specifies whether the record 220 specifies source data is included in the current state (i.e., 1). As shown, the write state application 140(1) sets the state flag 226(1) included in the record 220(0) to true to indicate that the record 220(0) represents source data values that are included in the source dataset 122 associated with the state 1.

After updating the record lists 142 to represent the source dataset 122 when the source dataset 122 is in the state of 1, the write state application 140 generates the snapshot 152(1)

that represents the state 1 of the source dataset 122. As described in conjunction with FIG. 2A, the write state application 140 generates the snapshot 152(1) based on the state flags 226(1). As a result, the compressed record list 290(0) included in the snapshot 152(1) represents both instances of the type 210(0) of movie objects.

The write state application 140 also generates the delta file 154(0) that specifies instructions to transition from the state 150(0) to the state 150(1) and the reverse delta file 154(1) that species instructions to transition from the state 150(1) to the state 150(0). More specifically, as shown, the delta file 150(0) includes an instruction to add the compressed data 224(1) to the compressed record list 290(0) corresponding to the record list 142(0) of type 210(0) based on the ordinal 222 of 1. By contrast, the reverse delta file 150(1) includes an instruction to delete the compressed data 224(1) included in the compressed record list 290(0) corresponding to the record list 142(0) of type 210(0) located at the ordinal 222 of 1. Together, the snapshot 152(1), the delta file 154(0), and the reverse delta file 156(1) comprise the state files 150(1).

Efficiently Representing Source Data Values Based on the Data Model

Figure 3A:
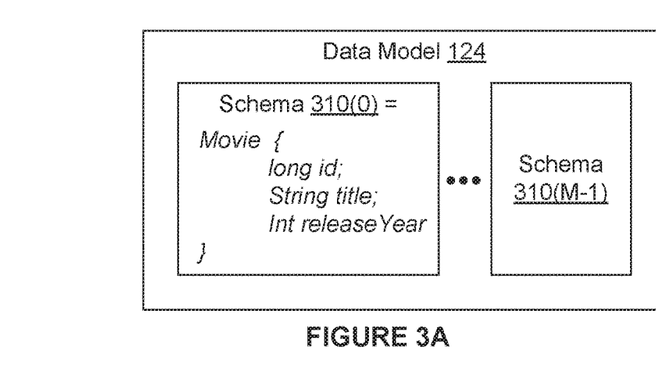
FIGS. 3A-3C illustrate a sequence of operations performed by the write state application 140 of FIG. 1 when generating a compressed record list, according to various embodiments of the present invention.
Figures 3B, 3C:
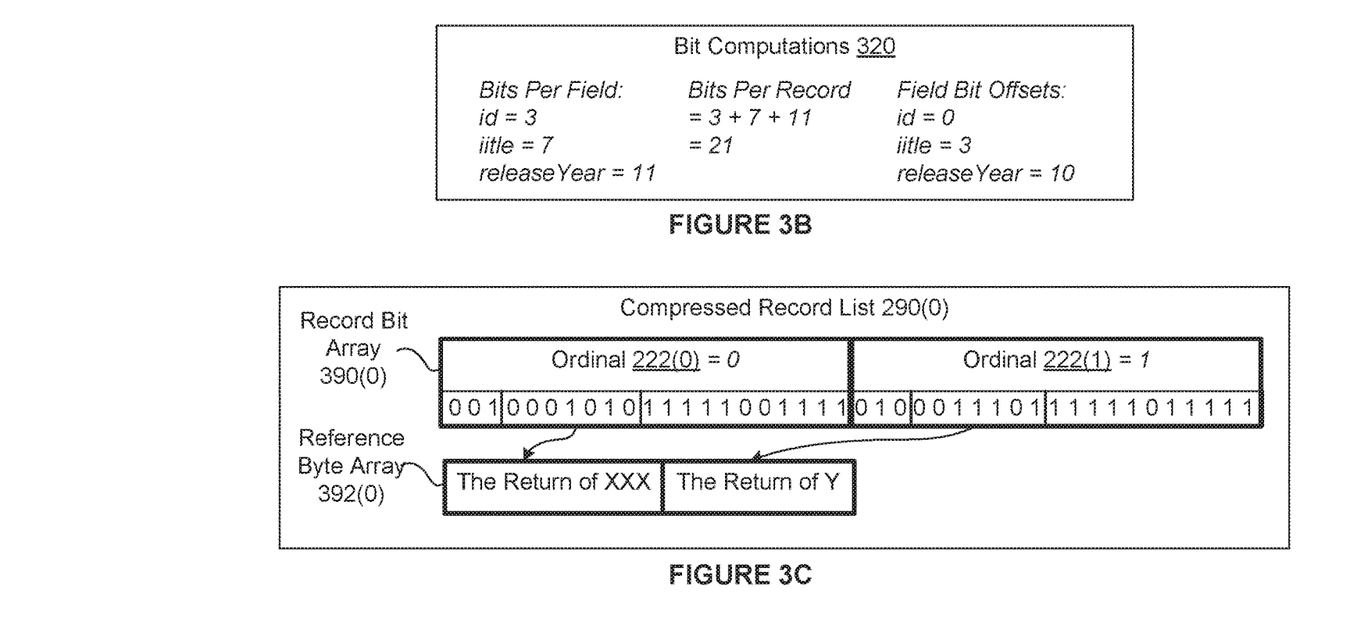

FIGS. 3A-3C illustrate a sequence of operations performed by the write state application 140 of FIG. 1 when generating the compressed record list 290(0), according to various embodiments of the present invention. In alternate embodiments, the write state application 140 may generate the compressed record list 290(0) in any technically feasible fashion that reflects the data model 124 and the source dataset 122.

FIG. 3A depicts the data model 124 that the write state application 140 reads as part of generating the compressed record list 290(0). As shown, the data model 124 includes, without limitation, any number of schemas 310. Each of the schemas 310 includes, without limitation, any amount and type of metadata that defines a structure of the records 220 included in the record list 142 associated with a specific type 210.

In some embodiments, the types 210 include, without limitation, any number of object types associated with specific Plain Old Java Object (POJO) classes, any number of list types, any number of set types, and any number of map types. In alternate embodiments, any number of types 210 may be defined by the schemas 310 in any technically feasible fashion. In some embodiments, one or more of the types 210 may comprise hierarchical types 210.

As shown, the schema 310(0) includes metadata that specifies a POJO class named "movie." The movie class includes, without limitation, an id field of type long, a title field of type string, and a releaseYear field of type int. Although not shown in FIG. 3, the source dataset 122 specifies two POJO objects of the POJO class movie. The first POJO object specifies a movie entitled "The Return of XXX," and the second POJO object specifies a movie entitled "The Return of Y."

Although not shown, in various embodiments, the data model 124 associates any number of the schemas 310 with any number and type of indices. As part of generating an API, the write state application 140 may generate methods that enable applications to locate records 220 based on an index. For example, the data model 124 may specify that the id field of the movie class is a primary index. In response, the write state application 140 may generate a method that enables applications to locate a particular record 220 associated with the type 210 of movie object based on a specified id value. Further, the write state application 140 may generate a method that enables applications to iterate over the records 220 included in a particular record list 290 based on the value of a particular field.

After, reading the data model 124 and the source dataset 122, the write state application 140 generates the record list 142(0) that specifies the type 210(0) of movie object. The record list 142(0) includes, without limitation, the records 220(0) and 220(1) specifying, respectively, the movie entitled "The Return of XXX" and the movie entitled "The Return of Y." As part of generating the records 220(0) and 220(1), the write state application 140 determines a fixed number of total bits used for the compressed data 224 included in the each of the records 220.

FIG. 3B depicts bit computations 320 that the write state application 140 performs to determine the fixed number of total bits used for the compressed data 224 included in the records 220 associated with the type 210(0) of movie object. First, the write state application 140 determines a minimum number of bits required to properly represent each of the fields associated with the type 210(0) of movie object.

As shown, for the type 210(0) of movie object, the write state application 140 determines that the minimum number of bits required to represent the id field is 3, the minimum number of bits required to represent the title field is 7, and the minimum number of bits required to represent the releaseYear field is 11. Consequently, the write state application 140 computes the fixed number of bits used to represent the compressed data 224 for the records 220 associated with the type 210(0) of movie object as 21 (3+17+11). In alternate embodiments, the write state application 140 may determine the fixed number of bits used to represent each field in any technically feasible fashion.

In some embodiments, the write state application 140 represents the values for certain types of fields (e.g., strings and bytes) in the compressed data 224 as offsets into a separate reference byte array 392. Each offset specifies where the corresponding value for the field ends. For example, the value for the title field of type string is represented in the compressed data 224 as an offset into the separate reference byte array 392. In alternate embodiments, the write state application 140 may determine whether to represent each field directly or indirectly in any technically feasible fashion.

The write state application 140 also determines field bit offsets based on the minimum number of bits required to represent each of the fields. Each of the field bit offsets specifies the start location of a particular field within a particular compressed data 224. As shown, within the compressed data 224(0), the value of the id field starts at bit 0, the value of the title field starts at bit 3, and the value of the releaseYear field starts at bit 10.

Notably, unlike data that is compressed via a conventional compression algorithm that performs the same operations irrespective of the type of data, the compressed data 224 reflects the structure of the associated record 220. As a result, applications may access the individual values for the fields within the compressed data 242 without performing any operations (e.g., decompression operations) that expand/inflate the compressed data 242. Accordingly, as an application accesses source data values via the in-memory dataset 184, the size of the in-memory dataset 184 is maintained.

To generate the compressed data 224, the write state application 140 performs any number of compression operations on the source dataset 122. Examples of compression operations include deduplication operations, encoding operations, packing operations and overhead elimination operations, etc. In alternate embodiments, the write state application 140 may generate the compressed data 224 in any technically feasible fashion based on the source dataset 122 and the data model 124.

Finally, for each of the record lists 142, the write state application 140 pacts the compressed data 224 for the included records 220 into a record bit array 390 in sequentially increasing order based on the ordinals 222. Consequently, if the record 220(i) is included in the record list 142(j) of type 210(j), then the start location of the compressed data 224(i) is equal to the product of the fixed number of total bits used to represent the type 210(j) and the ordinal 222(i).

For explanatory purposes only, FIG. 3C depicts the compressed record list 290(0) that the write state application 140 generates to represent the two records 220 included in the record list 142 associated with the type 210 of movie object. As shown, the compressed record list 290(0) includes, without limitation, the record bit array 390(0) and the reference byte array 392(0).

The movie entitled "The Return of XXX" is represented by the record 220(0) having the ordinal 222(0) of 0. Consequently, the movie entitled entitled "The Return of XXX" is represented by the bits 0 through 20. The movie entitled "The Return of Y" is represented by the record 220(1) having the ordinal 222(1) of 1. Consequently, the movie entitled entitled "The Return of Y" is represented by the bits 21 through 41.

Advantageously, by representing each of the fields in each of the record 220 using a fixed but optimized number of bits, the write state application 140 optimizes the memory required to store the snapshot 152 and the time required to locate the values for the fields within the snapshot 152. Further, because the value for each of the fields is located in a consistent manner that is independent of the values for the other fields, applications can perform read-only operations on the values for fields without distributing the layout of the snapshot 152. As a result, an application executing on the consumer 170 operates with the in-memory dataset 184 while retaining a size of the in-memory dataset 184.

In various embodiments, the compressed record list 290 may include any number and type of components (e.g., bit arrays, byte arrays, etc.) and the number and type of components may vary based on the type 210. For example, for the types 210 of set, list, and map, the compressed record list 290 could include two bit arrays.

Figure 4:
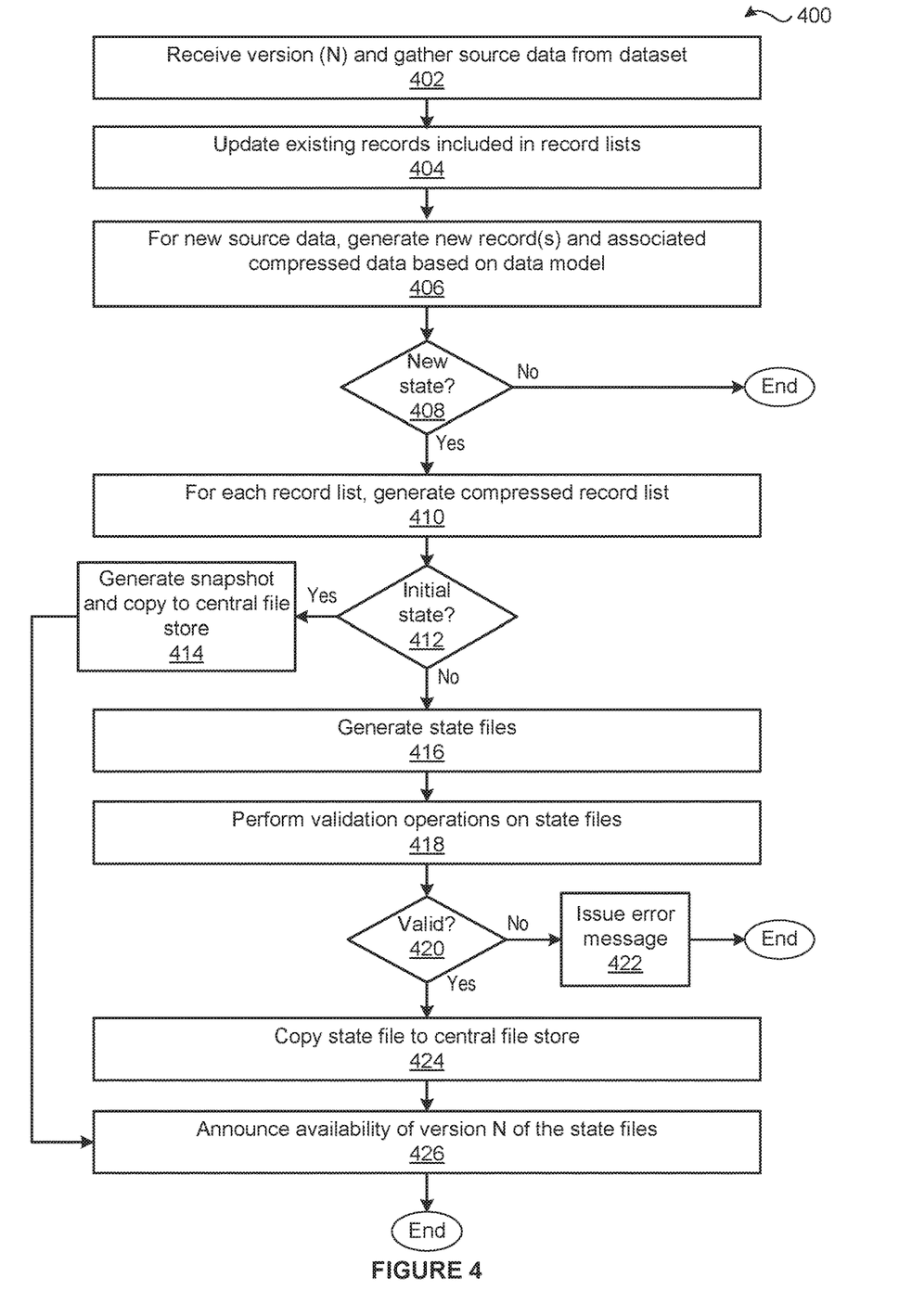
FIG. 4 is a flow diagram of method steps for generating one or more state files for a source dataset, according to various embodiments of the present invention.

FIG. 4 is a flow diagram of method steps for generating one or more state files for a source dataset, according to various embodiments of the present invention. Although the method steps are described with reference to the systems of FIGS. 1-3C, persons skilled in the art will understand that any system configured to implement the method steps, in any order, falls within the scope of the present invention. For explanatory purposes only, the method steps are described in the context of the write state application 140 executing a single write cycle associated with a specified version N. However, the read state application 180 may execute the method steps any number of times and based on any write cycle criterion. An example of a write cycle criterion is a time interval between write cycles.

As shown, a method 400 begins at step 402, where the write state application 140 receives a version N and gathers source data values from the source dataset 122. At step 404, for each of the schemas 310(i) included in the data model 124, the write state application 140 updates the records 220 included in the record list 142(i). More precisely, for each of the records 220, if the compressed data 224 reflects source data values that are included in the source dataset 122, then the write state application 140 sets the state flag 226(N) equal to true. Otherwise, the write state application 140 sets the state flag 226(N) equal to false.

At step 406, if the source dataset 122 includes data values that are not reflected in the records 220, then the write state application 140 generates one or more new records 220. For each of the new records 220, the write state application 140 generates the compressed data 224 based on the applicable schema 310, sets the state flag 226(N) equal to true, and sets the state flag 226(N−1) equal to false. Then, for each of the new records 220, the write state application 140 includes the record 220 in the record list 142 associated with the applicable schema 310.

The write state application 140 may perform any number of compression operations on the source dataset 122 to generate the compressed data 224. Examples of compression operations include deduplication operations, encoding operations, packing operations and overhead elimination operations, etc. In alternate embodiments, the write state application 140 may generate the compressed data 224 in any technically feasible fashion based on the source dataset 122 and the data model 124.

At step 408, the write state application 140 determines whether the source dataset 122 is associated with a new state. More precisely, if the source dataset 122 represents an initial state or the source data values included in the source dataset 122 do not differ from the source data values represented in the snapshot 150(N−1), then the write state application 140 determines that the source data set 122 is associated with a new state.

To determine whether the source data values differ from the source data values represented in the latest state 150(N−1), the write state application 140 compares the state flag 226(N) to the state flag 226(N−1). If, for any of the records 220, the state flag 226(N) is not equal to the state flag 226(N−1), then the write state application 140 determines that the source data values differ from the source data values represented in the latest state 150(N−1). If, for all the records 220, the state flag 226(N) is equal to the state flag 226(N−1), then the write state application 140 determines that the source data values do not differ from the source data values represented in the state 150(N−1).

If, at step 408, the write state application 140 determines that the source dataset 122 is not associated with a new state, then the method 400 terminates. If, however, at step 408, the write state application 140 determines that the source dataset 122 is associated with a new state, then the method 400 proceeds to step 410. At step 410, for each of the record lists 142, write state application 140 serializes the records 122 included in the record list 142 to generate the record bit array 390 included in the compressed record list 290. For certain types of source data values (e.g., strings, bytes, etc.) represented by the records 122, the write state application 140 may also generate one or more reference byte arrays 392 that are referenced by the record bit array 390. In alternate embodiments, the write state application 140 may generate the compressed record lists 290 in any technically feasible fashion.

At step 412, the write state application 140 determines whether the source dataset 122 is in an initial state. If, at step 412, the write state application 140 determines that the source dataset 122 is in an initial state, then the method 400 proceeds to step 414. At step 414, the write state application 140 generates the snapshot 152 representing the initial state based on the compressed record lists 290. The snapshot 152 comprises the state file 150(0) representing the initial state (i.e., version 0). The write state application 140 copies the snapshot 152(0) to the central file store 160. The method 400 then proceeds directly to step 426.

If, at step 412, the write state application 140 determines that the source dataset 122 is not in an initial state, then the method 400 proceeds directly to step 416. At step 416, the write state application 140 generates the snapshot 152(N), the delta file 152(N−1), and the reverse delta file 154(N) that comprise the state files 150(N) associated with the version N. The snapshot 152(N) represents the state associated with the version N. The delta file 152(N−1) specifies a set of instructions to transition from the snapshot 152(N−1) to the snapshot 152(N). The reverse delta file 154(N) specifies a set of instructions to transition from the snapshot N to the snapshot (N−1).

At step 418, the write state application 140 performs validation operations on the state files 150(N). First, the write state application 140 applies the delta file 152(N−1) to the snapshot 152(N−1) to generate a forward snapshot. The write state application 140 then applies the reverse delta file 154(N) to the snapshot 152(N) to generate a reverse snapshot. If the forward snapshot matches the snapshot 152(N) and the reverse snapshot matches the snapshot 152(N−1), then the write state application 140 determines that the state files 150(N) are valid. By contrast, if the forward snapshot differs from the snapshot 152(N) or the reverse snapshot differs from the snapshot 152(N−1), then the write state application 140 determines that the state files 150(N) are invalid.

At step 420, the write state application 140 determines whether the state files 150(N) are valid. If, at step 420, the write state application 140 determines that the state files 150(N) are invalid, then the method 400 proceeds to step 422. At step 422, the write state application 140 issues an error message, and the method 400 terminates. If, however, at step 420, the write state application 140 determines that the state files 150(N) are valid, then the method 400 proceeds directly to step 424. At step 424, the write state application 140 copies the state files 150(N) to the central file store 160.

At step 426, the write state application 140 announces the availability of the state file(s) 150 corresponding to the state associated with the version N. The write state application 140 may announce the availability of the state file(s) 150 in any technically feasible fashion. For example, the write state application 140 could write the value N to a memory location that stores the latest version 192 and is included in the announcement subsystem 192 accessible to the the consumers 170. The method 400 then terminates.

Figure 5:
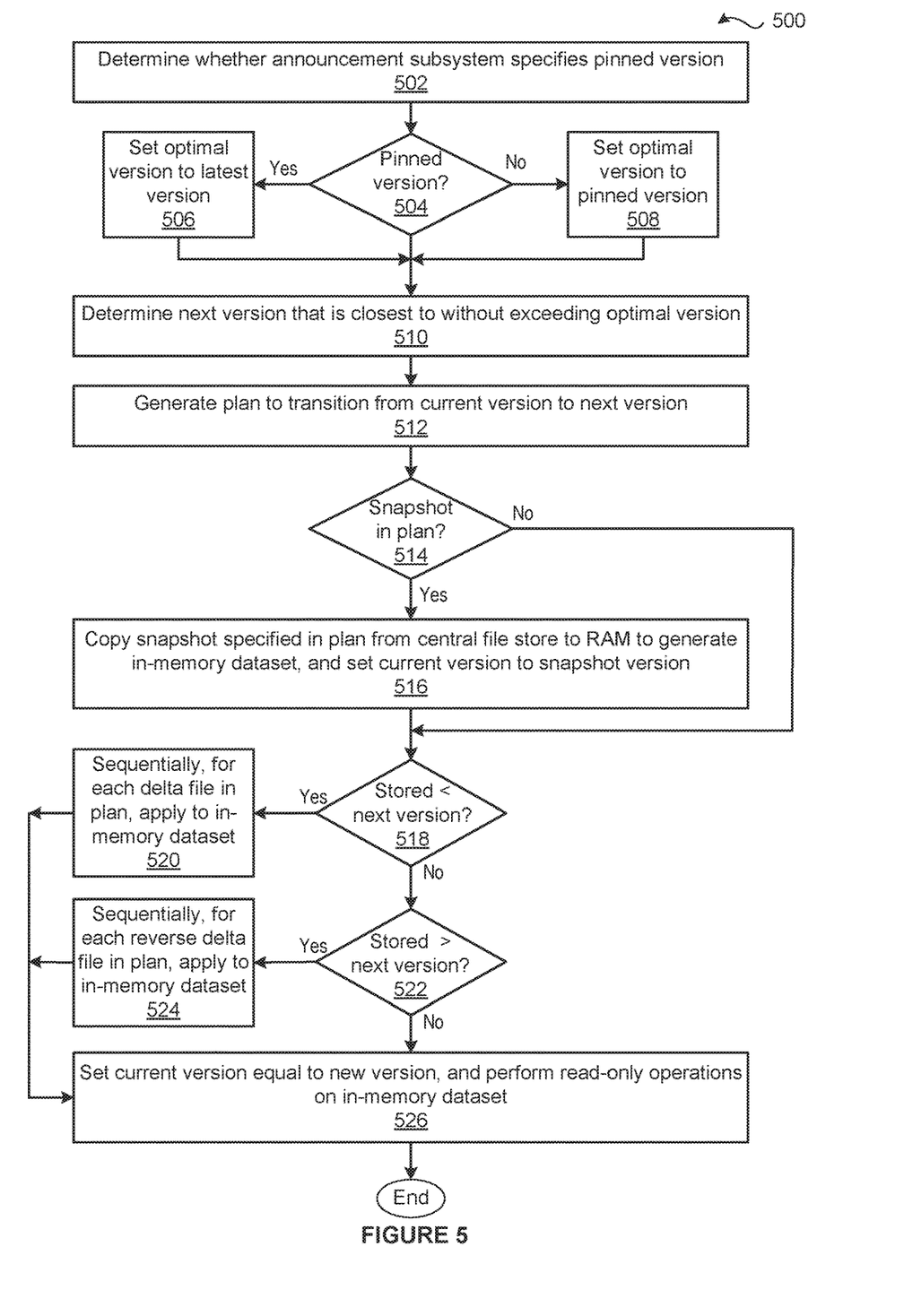
FIG. 5 is a flow diagram of method steps for generating a current version of an in-memory dataset on which to perform one or more operations, according to various embodiments of the present invention.

FIG. 5 is a flow diagram of method steps for generating a current version of an in-memory dataset on which to perform one or more operations, according to various embodiments of the present invention. Although the method steps are described with reference to the systems of FIGS. 1-3C, persons skilled in the art will understand that any system configured to implement the method steps, in any order, falls within the scope of the present invention.

For explanatory purposes only, the method steps are described in the context of a single read state application 180 executing in a single consumer 170(i) to generate a single in-memory dataset 184 stored in the RAM 116(i). However, any number of read state application 180 executing in any number of consumers 170 may execute the method steps serially, concurrently, or at least partially concurrently to generate in-memory datasets 184 stored in different RAMs 116. Further, the read state application 180 may execute the method 500 any number of times and based on any read cycle criterion. Examples of read cycle criterion include detecting a change to the latest version 192, detecting a change to the pinned version 194, and a time interval between read cycles, to name a few.

As shown, a method 500 begins at step 502, where the read state application 180 determines whether the announcement subsystem 190 specifies the pinned version 194. If, at step 504, the read state application 180 determines that the announcement subsystem 190 does not specify the pinned version 194, then the method 500 proceeds to step 506. At step 506, the read state application 180 sets an optimal version equal to the latest version 192 specified via the announcement subsystem 190. The method 500 then proceeds directly to step 510.

If, however, at step 504, the read state application 180 determines that the announcement subsystem 190 specifies the pinned version 194, then the method 500 proceeds directly to step 508. At step 508, the read state application 180 sets the optimal version equal to the pinned version 194.

At step 510, the read state application 180 determines a next version based on the optimal version and the state files 150 stored in the central file store 160. More precisely, the read state application 180 determines one or more "available" versions for which the required state files 150 are stored in the central file store 160. Subsequently, the read state application 180 selects the available versions that do not exceed the optimal version. Then, the read state application 180 sets the next version equal to the highest selected version.

At step 512, the read state application 180 generates a plan to transition the in-memory dataset 184 from the stored version 182 to the next version. If the stored version 182 is less than the next version, then the plan includes one of the snapshots 152 and/or one or more delta files 154. If the stored version 182 is greater than the next version, then the plan includes one of the snapshots 152 and/or one or more of the reverse delta files 156. If the stored version 182 is equal to the next version, then the plan is empty.

At step 514, the read state application 180 determines whether one of the snapshots 152 is included in the plan. If, at step 514, the read state application 180 determines that one of the snapshots 152 is included in the plan, then the method 500 proceeds to step 516. At step 516, the read state application 180 selects the snapshot 152 specified in the plan. The read state application 180 then copies the selected snapshot 152 from the central file store 160 to the random access memory (RAM) 116 to generate the in-memory dataset 184. As part of step 514, the read state application 180 sets the stored version 182 equal to the version associated with the selected snapshot 152. If, however, at step 514, the read state application 180 determines that none of the snapshots 152 are included in the plan, then the method 500 proceeds directly to step 518.

At step 518, the read state application 180 determines whether the stored version 182 is less than the next version. If, at step 518, the read state application 180 determines that the stored version 182 is less than the next version, then the method 500 proceeds to step 520. At step 520, for each of the delta files 152 included in the plan, the read state application 180 sequentially applies the delta file 152 to the in-memory dataset 184. The method 500 the proceeds directly to step 526. If, however, at step 518, the read state application 180 determines that the stored version 182 is not less than the next version, then the method 500 proceeds directly to step 522.

At step 522, the read state application 180 determines whether the stored version 182 is greater than the next version. If, at step 522, the read state application 180 determines that the stored version 182 is greater than the next version, then the method 500 proceeds directly to step 524. At step 524, for each of the reverse delta files 154 included in the plan, the read state application 180 sequentially applies the reverse delta file 154 to the in-memory dataset 184. The method 500 then proceeds directly to step 526. If, however, at step 522, the read state application 180 determines that the stored version 182 is not greater than the next version, then the method 500 proceeds directly to step 526.

At step 526, the read state application 180 sets the stored version 182 equal to the next version. The read state application 180 then performs any number of operations with the in-memory dataset 184. The method 500 then terminates.

In sum, the disclosed techniques may be used to efficiently implement datasets in computing environments. A dataset dissemination system includes, without limitation, a source dataset, a data model, a producer, a central file store, an announcement subsystem, and any number of consumers. During an initial cycle, a write state engine included in the producer gathers source data values included in a source dataset. The write state engine translates the source data values into compressed data based on schemas defined in the data model.

Each compressed data comprises a fixed-length bit-aligned representation of one or more of the source data values. Further, each compressed data allows individual access of each of the represented source data values. Subsequently, the write state engine generates a snapshot that includes the compressed records and copies the snapshot to the central file store. The snapshot represents the source data values at an initial state 0. The write state engine then announces that state 0 is the latest state via the announcement subsystem.

During each subsequent cycle N, the write state engine gathers source data values from the data source and generates state files. The state files includes, without limitation, a snapshot corresponding to the state N, a delta file, and a reverse delta file. The delta file includes a set of encoded instructions to transition from the state (N−1) to the state N. By contrast, the reverse delta file includes a set of encoded instructions to transition form the state N to the state (N−1). Subsequently, the producer copies the state files to the central file store and announces the availability of state N via the announcement system.

Periodically, for each consumer, a read state engine included in the consumer determines the optimal state based on the announcement system. In general, the optimal state is the latest reliable and available state. If the consumer is starting-up or an in-memory dataset stored in RAM does not correspond to the optimal state, then the read state engine generates and executes a plan to modify the in-memory dataset to correspond to the optimal state. For example, if the consumer is starting-up and the optimal state is "N," then the read state engine could copy the snapshot associated with the state N from the central file store to the RAM to generate an in-memory dataset. By contrast, if the RAM already stores an in-memory dataset corresponds to the state M, then the read state engine could sequentially apply a series of delta files or reverse delta files to the in-memory dataset. Applying the series of files to the in-memory dataset modifies the in-memory dataset to represent the state N.

Advantageously, because the in-memory dataset includes compressed, fixed-length bit-aligned representations of the source data values, the amount of memory required to store the in-memory dataset is less than the amount of memory required to store the source dataset. Consequently, the disclosed techniques can enable a consumer to store the source data values in RAM when the size of the source dataset exceeds the storage capacity of the RAM. Further, since the in-memory dataset is stored in RAM, latencies experienced while performing read-only operations on the in-memory dataset are decreased relative to the latencies typically experienced while performing read-only operations on a dataset that is stored in a remote location.

1. In some embodiments, a method comprises performing one or more compression operations on a first source dataset having a first size to generate a first compressed record; serializing the first compressed record and a second compressed record to generate a first compressed record list; and generating a first snapshot having a second size based on the first compressed record list, wherein the second size is less than the first size, wherein, when one or more data values included in the first snapshot and associated with the first source dataset are accessed from the first snapshot, the first size of the first snapshot is maintained.

2. The method of clause 1, wherein the first compressed record list comprises a fixed-length and bit-aligned sequence of bits.

3. The method of clauses 1 or 2, wherein generating the first snapshot comprises serializing the first compressed record list and at least a second compressed record list.

4. The method of any of clauses 1-3, wherein the one or more compression operations comprise a deduplication operation, an encoding operation, a packing operation, or an overhead elimination operation.

5. The method of any of clauses 1-4, further comprising determining that the source dataset has been modified to generate a second source dataset; generating a second snapshot based on the second source dataset; and generating a delta file based on at least one difference between the first source dataset and the second source dataset, wherein the delta file includes one or more instructions for generating the second snapshot from the first snapshot.

6. The method of any of clauses 1-5, wherein an application programming interface provides a first method for accessing the one or more data values included in the first snapshot.

7. The method of any of clauses 1-6, wherein the application programming interface further includes a second method for generating an index associated with the first compressed record list.

8. The method of any of clauses 1-7, wherein the first compressed record is associated with a first schema included in a data model.

9. In some embodiments, a computer-readable storage medium includes instructions that, when executed by a processor, cause the processor to perform the steps of performing one or more compression operations on a first source dataset having a first size based on a data model to generate a first compressed record; generating a first compressed record list based on the first compressed record and a second compressed record; and generating a first snapshot having a second size based on the first compressed record list, wherein the second size is less than the first size, wherein, when one or more data values included in the first snapshot and associated with the first source dataset are accessed from the first snapshot, the first size of the first snapshot is maintained.

10. The computer-readable storage medium of clause 9, wherein the first compressed record list comprises a fixed-length and bit-aligned sequence of bits.

11. The computer-readable storage medium of clauses 9 or 10, wherein generating the first snapshot comprises serializing the first compressed record list and at least a second compressed record list.

12. The computer-readable storage medium of any of clauses 9-11, wherein the one or more compression operations comprise a deduplication operation, an encoding operation, a packing operation, or an overhead elimination operation.

13. The computer-readable storage medium of any of clauses 9-12, further comprising determining that the source dataset has been modified to generate a second source dataset; generating a second snapshot based on the second source dataset; and generating a delta file based on at least one difference between the first source dataset and the second source dataset, wherein the delta file includes one or more instructions for generating the second snapshot from the first snapshot.

14. The computer-readable storage medium of any of clauses 9-13, further comprising prior to determining that the source dataset has been modified, setting a latest version associated with a notification system equal to a first version associated with the first snapshot; and after generating the second snapshot, setting the latest version equal to a second version associated with the second snapshot.

15. The computer-readable storage medium of any of clauses 9-14, further comprising, prior to setting the latest version equal to the second version applying the delta file to the first snapshot to generate a third dataset; and determining that the third dataset matches the second snapshot.

16. The computer-readable storage medium of any of clauses 9-15, further comprising determining that the source dataset has been modified to generate a second source dataset; generating a second snapshot based on the second source dataset; and generating a reverse delta file based on a difference between the first source dataset and the second source dataset, wherein the reverse delta file includes one or more instructions for generating the first snapshot from the second snapshot.

17. In some embodiments, a system comprises a memory storing a write state application; and a processor coupled to the memory, wherein when executed by the processor, the write state application causes the processor to perform one or more compression operations on a first source dataset having a first size to generate a first compressed record, performing one or more serialization operations to generate a first snapshot having a second size based on the first compressed record and at least a second compressed record, wherein the second size is less than the first size, and wherein, when a data value included in the first snapshot and associated with the first source dataset is accessed from the first snapshot, the first size of the first snapshot is maintained.

18. The system of clause 17, wherein the first compressed record comprises a fixed-length and bit-aligned sequence of bits.

19. The system of clauses 17 or 18, wherein the one or more compression operations comprise a deduplication operation, an encoding operation, a packing operation, or an overhead elimination operation.

20. The system of any of clauses 17-19, wherein the write state application further causes the processor to determine that the source dataset has been modified to generate a second source dataset; generate a second snapshot based on the second source dataset; and generate a delta file based on at least one difference between the first source dataset and the second source dataset, wherein the delta file includes one or more instructions for generating the second snapshot from the first snapshot.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
retrieving a first record included in a first source dataset having a first size;
generating, from the first record, a first compressed record by:
performing one or more compression operations on one or more data values included in the first record to generate first compressed data,
generating a first identifier value,
generating one or more state flags indicating whether the first record represents an initial state of the first source dataset at a first point in time or one or more subsequent states of the first source dataset at one or more points in time that are subsequent to the first point in time, and
combining the first identifier value with the first compressed data and the one or more state flags to generate the first compressed record;
generating, based on the first compressed record and a second compressed record, a first compressed record list, wherein the second compressed record includes a second identifier value and second compressed data;
generating, based on the first compressed record list, a first snapshot having a second size, wherein the second size is less than the first size;
storing the first snapshot in a memory, wherein when, based on the first identifier, the one or more data values included in the first snapshot are accessed from the first snapshot, the second size is maintained;
generating a second snapshot based on a second source dataset that is a modified version of the first source dataset;
generating a delta file that includes one or more instructions for generating the second snapshot from the first snapshot;
applying the delta file to the first snapshot to generate a third snapshot;
determining that the third snapshot matches the second snapshot; and
in response to determining that the third snapshot matches the second snapshot, storing the second snapshot and the delta file in the memory.

2. The computer-implemented method of claim 1, wherein the first compressed record list comprises a fixed-length and bit-aligned sequence of bits.

3. The computer-implemented method of claim 1, wherein:
the first compressed record list comprises a first record bit array that includes the first compressed data and the second compressed data, and
the first record bit array is generated based on a first object schema.

4. The computer-implemented method of claim 1, wherein the one or more compression operations comprise at least one of a deduplication operation, an encoding operation, a packing operation, or an overhead elimination operation.

5. The computer-implemented method of claim 1, wherein an application programming interface (API) provides a first method for accessing, via a read-only operation and based on a first object schema and the first identifier, the one or more data values included in the first snapshot.

6. The computer-implemented method of claim 5, wherein the application programming interface further includes a second method for generating an index associated with the first compressed record list.

7. The computer-implemented method of claim 1, wherein:
a data model includes a first object schema and a second object schema that is associated with a data type, and
the second compressed record is generated from a second record and is based on the second object schema.

8. One or more non-transitory computer-readable storage media including instructions that, when executed by one or more processors, cause the one or more processors to perform the steps of:
retrieving a first record included in a first source dataset having a first size;
generating, from the first record, a first compressed record by:
performing one or more compression operations on one or more data values included in the first record to generate first compressed data,
generating a first identifier value, generating one or more state flags indicating whether the first record represents an initial state of the first source dataset at a first point in time or one or more subsequent states of the first source dataset at one or more points in time that are subsequent to the first point in time, and
combining the first identifier value with the first compressed data and the one or more state flags to generate the first compressed record;
generating, based on the first compressed record and a second compressed record, a first compressed record list, wherein the second compressed record includes a second identifier value and second compressed data;
generating, based on the first compressed record list, a first snapshot having a second size, wherein the second size is less than the first size;
storing the first snapshot in a memory, wherein when, based on the first identifier, the one or more data values included in the first snapshot are accessed from the first snapshot, the second size is maintained;
generating a second snapshot based on a second source dataset that is a modified version of the first source dataset;
generating a delta file that includes one or more instructions for generating the second snapshot from the first snapshot;
applying the delta file to the first snapshot to generate a third snapshot;

determining whether the third snapshot matches the second snapshot; and in response to determining that the third snapshot matches the second snapshot, storing the second snapshot and the delta file in the memory.

9. The one or more non-transitory computer-readable storage media of claim 8, wherein the first compressed record list comprises a fixed-length and bit-aligned sequence of bits.

10. The one or more non-transitory computer-readable storage media of claim 8, wherein:

the first compressed record list comprises a first record bit array that includes the first compressed data and the second compressed data, and the first record bit array is generated based on a first object schema.

11. The one or more non-transitory computer-readable storage media of claim 8, wherein the one or more compression operations comprise at least one of a deduplication operation, an encoding operation, a packing operation, or an overhead elimination operation.

12. The one or more non-transitory computer-readable storage media of claim 8, further comprising instructions that, when executed by the one or more processors, cause the one or more processors to perform the steps of:

prior to generating the second snapshot based on the second source dataset that is the modified version of the first source dataset, setting a latest version associated with a notification system equal to a first version associated with the first snapshot; and after generating the second snapshot, setting the latest version equal to a second version associated with the second snapshot.

13. The one or more non-transitory computer-readable storage media of claim 8, further comprising instructions that, when executed by the one or more processors, cause the one or more processors to perform the steps of:

generating a reverse delta file based on a difference between the first source dataset and the second source dataset, wherein the reverse delta file includes one or more instructions for generating the first snapshot from the second snapshot;

applying the reverse delta file to the second snapshot to generate a fourth snapshot;

determining that the third snapshot matches the second snapshot and the fourth snapshot matches the first snapshot; and in response to determining that the third snapshot matches the second snapshot and the fourth snapshot matches the first snapshot, storing the second snapshot, the delta file, and the reverse delta file in the memory.

14. The one or more non-transitory computer-readable storage media of claim 8, further comprising instructions that, when executed by the one or more processors, cause the one or more processors to perform the steps of:

in response to determining that the third snapshot does not match the second snapshot, issuing an error message without storing the second snapshot in the memory.

15. A system comprising:

a memory storing a write state application; and a processor coupled to the memory, wherein when executed by the processor, the write state application causes the processor to:

retrieve, from a data model, a first object schema included in the data model, wherein:

the first object schema is associated with a first record included in a first source dataset having a first size, the first record represents an instance of a first data type, and the first object schema defines a structure for the first data type;

generate, from the first record, a first compressed record by:

performing, based on the first object schema, one or more compression operations on one or more data values included in the first record to generate first compressed data, generating a first identifier value, generating one or more state flags indicating whether the first record represents an initial state of the first source dataset at a first point in time or one or more subsequent states of the first source dataset at one or more points in time that are subsequent to the first point in time, and combining the first identifier value with the first compressed data and the one or more state flags in the data structure to generate the first compressed record, generate, based on the first compressed record and at least a second compressed record, a first compressed record list, wherein the at least the second compressed record includes a second identifier value and second compressed data, generate, based on the first compressed record list, a first snapshot having a second size, wherein the second size is less than the first size, store the first snapshot in a memory, wherein when, based on the first object schema and the first identifier, the one or more data values included in the first snapshot are accessed from the first snapshot, the second size is maintained, generate a second snapshot based on a second source dataset that is a modified version of the first source dataset, generate a delta file that includes one or more instructions for generating the second snapshot from the first snapshot, apply the delta file to the first snapshot to generate a third snapshot, determine that the third snapshot matches the second snapshot, and in response to determining that the third snapshot matches the second snapshot, store the second snapshot and the delta file in the memory.

16. The system of claim 15, wherein the first compressed record comprises a fixed-length and bit-aligned sequence of bits.

17. The system of claim 15, wherein the one or more compression operations comprise at least one of a deduplication operation, an encoding operation, a packing operation, or an overhead elimination operation.

* * * * *